(12) United States Patent
Boehm et al.

(10) Patent No.: US 9,657,192 B2
(45) Date of Patent: May 23, 2017

(54) COATING PROCESS WITH SELF-CROSSLINKABLE COMPOSITION FOR ELECTRICAL STEEL SHEET

(71) Applicant: AXALTA COATING SYSTEMS IP CO., LLC, Wilmington, DE (US)

(72) Inventors: Frank-Rainer Boehm, Odenthal (DE); Barbara Froschauer, Gumpoldskirchen (DE); Michael Herm, Velbert (DE); Reinhard Wallner, Weigelsdorf (AT); Wolfgang Schuelke, Hann (DE); Volker Rittinghaus, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 243 days.

(21) Appl. No.: 14/366,789

(22) PCT Filed: Dec. 18, 2012

(86) PCT No.: PCT/US2012/070228
§ 371 (c)(1),
(2) Date: Jun. 19, 2014

(87) PCT Pub. No.: WO2013/096238
PCT Pub. Date: Jun. 27, 2013

(65) Prior Publication Data
US 2014/0349128 A1 Nov. 27, 2014

Related U.S. Application Data

(60) Provisional application No. 61/577,914, filed on Dec. 20, 2011, provisional application No. 61/577,926, filed on Dec. 20, 2011.

(51) Int. Cl.
| | |
|---|---|
| C09D 167/02 | (2006.01) |
| B32B 38/04 | (2006.01) |
| B32B 38/18 | (2006.01) |
| C08G 63/685 | (2006.01) |
| C09D 167/00 | (2006.01) |
| H01F 1/18 | (2006.01) |
| H01B 3/30 | (2006.01) |
| H01B 3/42 | (2006.01) |
| C08K 3/04 | (2006.01) |
| C08K 3/22 | (2006.01) |
| C08K 3/30 | (2006.01) |
| C08K 3/36 | (2006.01) |
| H01B 13/16 | (2006.01) |
| B32B 38/00 | (2006.01) |

(52) U.S. Cl.
CPC ........... *C09D 167/02* (2013.01); *B32B 38/04* (2013.01); *B32B 38/18* (2013.01); *C08G 63/6854* (2013.01); *C08K 3/04* (2013.01); *C08K 3/22* (2013.01); *C08K 3/30* (2013.01); *C08K 3/36* (2013.01); *C09D 167/00* (2013.01); *H01B 3/302* (2013.01); *H01B 3/421* (2013.01); *H01B 13/16* (2013.01); *H01F 1/18* (2013.01); *B32B 2038/0096* (2013.01); *B32B 2038/042* (2013.01); *B32B 2307/206* (2013.01); *B32B 2311/30* (2013.01); *B32B 2367/00* (2013.01); *B32B 2375/00* (2013.01); *B32B 2457/00* (2013.01); *C08K 2003/3045* (2013.01); *Y10T 156/1075* (2015.01); *Y10T 428/31688* (2015.04)

(58) Field of Classification Search
CPC ............ B32B 2375/00; B32B 2367/00; B32B 2311/30; C09D 167/00; C09D 167/02; Y10T 428/31681
See application file for complete search history.

(56) References Cited

U.S. PATENT DOCUMENTS

| | | | |
|---|---|---|---|
| 3,448,084 A * | 6/1969 | Francis | C08G 63/6854 528/289 |
| 4,446,300 A | 5/1984 | Mabrey et al. | |
| 5,536,791 A | 7/1996 | Schink et al. | |
| 6,908,692 B1 | 6/2005 | Boehm et al. | |
| 2008/0311413 A1 | 12/2008 | Boehm et al. | |
| 2010/0286313 A1 * | 11/2010 | Ma | C09D 153/00 524/35 |

FOREIGN PATENT DOCUMENTS

| | | | | |
|---|---|---|---|---|
| AT | WO 2009079540 A1 * | 6/2009 | ............ | B82Y 30/00 |
| DE | 1445263 | 9/1938 | | |

(Continued)

OTHER PUBLICATIONS

SIPO, Chinese Office Action issued in Application No. 2012800700351, dated Apr. 1, 2015.

(Continued)

*Primary Examiner* — Karuna P Reddy
(74) *Attorney, Agent, or Firm* — Lorenz & Kopf, LLP

(57) ABSTRACT

A coating process for electrical steel sheets using a varnish composition includes:
a) applying a varnish composition coating layer onto the surface of an electrical steel sheet. The varnish composition comprises
(A) about 1 to about 95 wt % of a resin comprising nucleophilic groups chosen from OH, NHR, SH, carboxylate and CH-acidic groups, and electrophilic groups which can react with the nucleophilic groups, wherein the resin is capable of transacylation in its main chain and/or side chain(s),
(B) about 5 to about 75 wt % of an organic solvent and/or water,
(C) 0 to about 40 wt % of a resin different from (A),
(D) 0 to about 10 wt % of a customary additive,
(E) 0 to about 40 wt % of a pigment, filler and/or nanoscaled particle and/or monomeric and/or polymeric element-organic compound, wherein the wt % is based on the total weight of the varnish composition;
b) curing the applied coating layer.

11 Claims, No Drawings

(56) References Cited

FOREIGN PATENT DOCUMENTS

| | | |
|---|---|---|
| DE | 1645435 | 7/1952 |
| EP | 0923088 A1 | 6/1999 |
| EP | 2222805 B1 | 11/2013 |
| JP | 62013591 A * | 1/1987 |
| JP | 2000345360 A | 12/2000 |
| WO | 2007019434 A1 | 2/2007 |
| WO | 2009079540 A1 | 6/2009 |

OTHER PUBLICATIONS

SIPO, Chinese Office Action issued in Application No. 2012800700351, dated Jul. 29, 2015.

SIPO, Chinese Office Action issued in Application No. 2012800700351, dated Dec. 28, 2015.

EPO, European Office Action issued in Application No. 12816560.2 dated Apr. 12, 2016.

ISA EPO, International Search Report and Written Opinion for International Application No. PCT/US2012/070228, dated Apr. 5, 2013.

ISA EPO, International Preliminary Report on Patentability for International Application No. PCT/US2012/070228, dated Jul. 3, 2014.

Behr, E., "High-Temperature-Resistant Plastics," Hanser Verlage, Munich 1969, pp. 64-67, and 84-87.

Cassidy, P.E. "Thermally Stable Polymers Synthesis and Properties," Department of Chemistry Southwest Texas State University, 1980, pp. 44-47.

Frazer, A.H., "High Temperature Resistant Polymers," 1968 pp. 106-115, vol. 21, No. 223.

Mair, H.J. et al., "Engineering Plastics," K '86 Report on Exhibition, 1987, pp. 204-208.

* cited by examiner

COATING PROCESS WITH SELF-CROSSLINKABLE COMPOSITION FOR ELECTRICAL STEEL SHEET

CROSS-REFERENCE TO RELATED APPLICATION

This application is a U.S. National-Stage entry under 35 U.S.C. §371 based on International Application No. PCT/US2012/070228, filed Dec. 18, 2012, which was published under PCT Article 21(2) and which claims priority to U.S. Provisional Application No. 61/577,914, filed Dec. 20, 2011, and to U.S. Provisional Application No. 61/577,926, filed Dec. 20, 2011, which are all hereby incorporated in their entirety by reference.

TECHNICAL FIELD

The technical field refers to a coating process for electrical steel sheet using a varnish composition based on new self-crosslinkable resin.

BACKGROUND

Electrical steel sheet varnishes to coat electrical steel and individual steel sheets are known. The coated electrical steel sheets can be assembled together by different technical means such as welding, clamping, interlocking, aluminium die casting or riveting to form a solid core for the use in electrical equipment, such as, transformers, generators and motors. The coatings provide electrical insulation between the metal sheets in core and should be able to meet the requirements of high surface insulation resistance, resistance to mechanical stress and corrosion and thermal stability.

JP 2000345360 and EP-A 923 088 relate to enamels for coating electrical steel sheets wherein the enamels contain particles, such as, silica or alumina colloid particles. The compositions result in coatings having properties, such as, good scratch, blocking, chemical and corrosion resistance and high surface insulation ability. Such coatings have no bonding function and need additional means of bonding (welding, clamping, interlocking, aluminium die casting or riveting) to form a solid core.

There are some known coating systems in use for the coating of electrical steel sheets suitable for, e.g., welding or punching applications to form a solid core. In view of this, the core sheet varnish selection is frequently a compromise since there are occasions when a single coating will not fulfil all requirements. The known ranking classes of such coatings, for example class C3, class C5, class C6 (registered as standards under AISI-ASTM A 976-03) show the different requirements of coatings in this field with regard to such properties. The coating may be only an organic mixture (C3 insulation type) or an organic/inorganic mixture of complex resins and chromate, phosphate and oxides (C5 and C6 insulation type).

C3 coatings based on organic resins, e.g., phenol, alkyd, acrylic and epoxy resin are used. The C3 coating will enhance punchability and is resistant to normal operating temperatures but will not withstand stress-relief annealing. In general, the C5 coating can be on the one hand a semi organic coating with very good punchability and good welding response and on the other hand a basically inorganic coating with organic resins and inorganic fillers, which has excellent welding and heat-resistance properties with good punchability. But C5 coatings are generally based on chromate-, phosphate- or on titanate-compounds, and they are therefore not environmental friendly, particularly with respect to the remaining carcinogenic level, or they can tend to hygroscopicity and insufficient annealing and corrosion resistance, or can show insufficient welding properties. C6 coatings are organic coatings with a high content of fillers approximately of 50 wt %.

The known systems are not able to combine different technical requirements, such as, welding, clamping, interlocking, punching, riveting, pressure resistance and thermal resistance to provide a high property profile standard.

EP-A 2152792 and EP-A 2222805 disclose varnishes for coating individual electrical steel sheets. The varnishes can comprise self-crosslinkable binder resins as co-binders which can be epoxy novolak systems and urethane and acryl modified epoxy resins. Such varnishes often do not have an acceptable solid content for a given viscosity of the compositions.

Known are self-crosslinkable systems based on transesterification as a crosslinking reaction for the manufacture of coatings for magnet wires. See for example DE1445263, DE1494452, DE1645435, EP616628 or U.S. Pat. No. 4,446, 300. Such coatings do not meet the properties necessary for electrical steel, for example, because the wettability and the solid content/viscosity ratio is insufficient and because they are typically dissolved in phenol, cresol and other organic solvents which do not fulfil the strict environmental requirements that apply for standard core sheet varnishes.

Accordingly, it is desirable to provide coating processes for electrical steel sheets to provide a high property profile standard for welding, clamping, interlocking, punching, riveting, high pressure and thermal resistance. In addition, other objects, desirable features and characteristics will become apparent from the subsequent summary and detailed description, and the appended claims, taken in conjunction with the accompanying drawings and this background.

SUMMARY

In accordance with an exemplary embodiment, a coating process for electrical steel sheet using a varnish composition is provided. The process comprises the steps of a) applying at least one coating layer of a varnish composition onto the surface of the electrical steel sheet wherein the varnish composition comprises (A) about 1 to about 95 wt % of at least one resin comprising nucleophilic groups selected from the group consisting of OH, NHR and SH, and electrophilic groups which can react with the above mentioned nucleophilic groups, wherein the resin is capable of transacylation in its main chain and/or side chain(s), (B) about 5 to about 75 wt % of at least one organic solvent and/or water, (C) 0 to about 40 wt % of at least one resin different from (A), (D) 0 to about 10 wt % of at least one customary additive, (E) 0 to about 40 wt % of at least one pigment, filler and/or nano-scaled particle and/or monomeric and/or polymeric element-organic compound, wherein the wt % is based on the total weight of the varnish composition (A) to (E) and wherein the amount of component (C) is smaller than the amount of component (A), and b) curing the applied at least one coating layer.

The process described herein provides excellent adhesion of the coatings to the surface of the electrical steel sheet as well as high corrosion resistance of the coatings and good electrical insulation. The coatings provided by the process contemplated herein show a high property profile standard combining the different technical requirements, such as, welding, clamping, interlocking, punching, riveting, high pressure and thermal resistance of electrical steel sheet coated with the composition described herein and of cores produced from these coated electrical steel sheet. Surprisingly, the varnish composition has a higher solid content for a given viscosity as the varnish compositions of prior art and, therefore, it provides a reduced energy consumption while curing the coating and, compared to standard core sheet varnishes, a reduced or no formaldehyde generation upon curing. It is possible to provide very thin coating layers in the range under about 1 micrometer, in combination with excellent adhesion and corrosion resistance. The varnish composition of the process contemplated herein is usable as one-component system.

DETAILED DESCRIPTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The application of the varnish composition by the coating process contemplated herein proceeds, e.g., by spraying, rolling or dip coating onto the surface of one or both sides of the electrical steel sheet.

The surface of the electrical steel sheet may be coated or uncoated, pretreated or unpretreated prior to the application according to step a) of the process. The sheet may be pretreated, for example, by washing in order to remove soiling, grease and other deposits.

Preferably, a pre-washed and uncoated electrical steel sheet is used, coated with the varnish composition contemplated herein by applying at least one coating layer, preferably one coating layer, of the varnish composition onto the surface of the electrical steel sheet.

Subsequently the curing (also known as crosslinking) of the coating on the electrical steel sheet takes place by thermal curing under definite curing conditions, preferably, at temperatures providing a PMT (peak metal temperature) in the range of about 180 to about 260° C., preferably about 230 to about 260° C. The ambient curing temperatures, for example oven temperatures, can be, for example, in the range of about 200 to about 600° C., preferred about 300 to about 450° C., and the curing can be done in a time period of about 10 seconds to about 1 minute, preferably about 10 to about 40 seconds, more preferably about 10 to about 20 seconds. The necessary heat can be supplied, for example, in an oven, by means of induction heating, infrared (IR) radiation, near infrared (NIR) radiation and/or hot air.

After curing, parts can be punched out of the coated electrical steel sheet and can then be stacked and assembled to form a sheet core by technical means selected from the group consisting of welding, clamping, interlocking, aluminium die casting or riveting, if necessary, by supply of heat and pressure. Welding is the preferred technical mean.

Therefore, an exemplary embodiment is also directed to a process for the production of electrical steel sheet core.

It is possible to apply the varnish composition contemplated herein as a water-based or a solvent-based varnish composition.

The resin of component A) is a self-crosslinking resin comprising nucleophilic group(s) selected from the group consisting of OH, NHR and SH, and comprising electrophilic group(s) which can react with the above mentioned nucleophilic group(s), wherein the resin is capable of transacylation in its main chain and/or in its side chain(s). The resin of component (A) can be used in amounts of about 1 to about 95 wt %, preferably about 5 to about 60 wt %, based on the total weight of the varnish composition.

The transacylation can be achieved by reacting the mentioned nucleophilic group(s) of the resin of component (A) with the mentioned electrophilic group(s) of the resin of component (A).

Examples of the resin of component (A) are poly(meth) acrylates, polyurethanes, alkyd resins, epoxy resins, polyesters, polyester amides/imides, unsaturated polyesters and/or polyester imides, silicon resins, polyolefines, polyvinyl alcohols, polytitanesters, as such known at a skilled person, comprising the above mentioned groups wherein the resin is capable of transacylation in its main chain and/or side chain(s).

Preferred nucleophilic groups are OH and/or SH.

Examples of electrophilic group(s) are carbon atoms bound via double-bond to oxygen atoms such as those in esters and/or amides.

Preferred electrophilic groups are glycol monoester groups (monoester groups of 1,2-diols) such as groups of monoesters of ethylene glycol, propylene glycol, hexylene glycol, and monoesters of terminal diols such as 1,3-propane diol, 1,4-butane diol, neopentyl glycol, hexane diol.

Preferred resins of component (A) are polyurethanes and/or polyesters comprising the above mentioned nucleophilic and electrophilic group(s) wherein the resins are capable of transacylation in their main chain and/or side chain(s).

As component (A) polyurethanes, for example, aliphatic polyurethanes, can be used having an acid value (mg KOH/g solid resin) in the range of about 18 to about 33 and a hydroxyl value (mg KOH/g solid resin) in the range of about 100 to about 170, comprising the above mentioned groups wherein the resins are capable of transacylation in their main chain and/or side chain(s). The number average molar mass Mn of those polyurethanes can be, for example from about 13000 to about 25000. Preferably, those polyurethanes carry terminal or side chain glycol monoester groups.

All the number average molar mass Mn data stated in the present description are determined or to be determined by gel permeation chromatography (GPC; divinylbenzene-cross-linked polystyrene as the immobile phase, tetrahydrofuran as the liquid phase, polystyrene standards) determined according to ISO 13885-1 standard.

The term hydroxyl value stated in the present description is defined as the number of mg of potassium hydroxide (KOH) which is equal to the number of mg acetic acid for acetalizing of 1 g of the resin, determined according to DIN 53240.

The term acid value stated in the present description is defined as the number of mg of potassium hydroxide required to neutralize the acid groups of the resin, according to DIN EN ISO 2114.

Furthermore, as component (A) polyesters can be used, including polyesters with heterocyclic nitrogen-containing rings, for example, polyesters with imide, hydantoin, benzimidazole, isocyanurate, amide and/or amide imide structures condensed into the molecule, comprising the above mentioned groups wherein the resins are capable of transacylation in their main chain and/or side chain(s).

The polyesters as such are, in particular, condensation products of polybasic aliphatic, aromatic and/or cycloaliphatic carboxylic acids and the anhydrides thereof, polyhydric alcohols and, in the case of imide-containing polyesters, amino group-containing compounds, optionally, with a proportion of monofunctional compounds, for example, monohydric alcohols, as known by a skilled person.

Preferred carboxylic acids and/or anhydrides are phthalic acid, isophthalic acid, terephthalic acid, adipic acid, the reaction product of 1 mol of 4,4'-diaminodiphenylmethane and 2 mols of trimellitic anhydride, and/or dodecanoic diacid and/or the anhydrides of the mentioned acids.

The carboxylic groups may also be incorporated into the polyesters by transesterification of esters of the above mentioned polybasic carboxylic acids.

Also hydroxyfunctional carboxylic acids such as 12-hydroxy stearic acid or dimethylol propionic acid may be used.

Preferred polyhydric alcohols are 1,2-diols such as ethylene glycol, propylene glycol, hexylene glycol, 1,3-propane diol, reaction products of polyaddition reactions of ethylene oxide and/or propylene oxide, 1,6-hexane diol, neopentyl glycol, trimethylol propane and tris(hydroxyethyl)isocyanurate (THEIC).

1,2-diols such as ethylene glycol and propylene glycol are preferred, and they are at the same time suitable to generate glycol monoester groups suitable for the transacylation in the main chain and/or in side chain(s) of such polyesters.

Furthermore, poly(meth)acrylates may also be used as component (A) comprising the above mentioned groups wherein the resins are capable of transacylation in their main chain and/or side chain(s). For example, poly(meth)acrylates may carry mono ester groups of 1,2-diols, for example by incorporation of hydroxyethyl(meth)acrylate into the poly(meth)acrylate backbone, as such known by a person skilled in the art.

The term (meth)acrylic stated herein is respectively intended to mean acrylic and/or methacrylic.

The production of the at least one resin of component (A) is known as such at a person skilled in the art and from the specialist literature, see, for example, Behr, "Hochtemperaturbestandige Kunststoffe" Hanser Verlage, Munich 1969; Cassidy, "Thermally Stable Polymers" New York: Marcel Dekker, 1980; Frazer, "High Temperature Resistant Polymers" New York: Interscience, 1968; Mair, Kunststoffe 77 (1987) 204.

Due to its chemical structure, as described above component (A) itself is able to form stable thermosetting films, without the use of any additional crosslinking resin(s).

The resin of component (A) may comprise nano-scaled particles which are chemically bound into the resin structure of component (A).

The nano-scaled particles as such typically have an average particle size in the range of about 1 to about 300 nm, preferably in the range of about 2 to about 80 nm. These are, for example, inorganic nano-scaled particles based on compounds, such as, $SiO_2$, $Al_2O_3$, $TiO_2$, boron nitride, silicon carbide.

The nano-scaled particles can be, for example, compounds based on an element-oxygen network comprising elements from the series consisting of silicon, zinc, aluminium, tin, boron, germanium, gallium, lead, the transition metals and the lanthanides and actinides, in particular, from the series consisting of silicon, titanium, zinc, yttrium, cerium, vanadium, hafnium, zirconium, nickel and/or tantalum. Usable particles are, e.g, colloidal solutions or dispersions of such particles, like silica, aluminum oxide, titanium oxide, preferably, colloidal silica, which are commercially available from, e.g., Nyacol® Corp., Grace Davison (Ludox® colloidal silica in water), Nissan Chemical. The surface of the element-oxygen network of the particles can be modified with reactive organic groups, as described, for example, in EP-A 1166283, to be able to react with reactive groups of the resin of component (A) to be chemically bound into the resin structure of component (A). Examples of suitable reactive particles are Aerosil products from Degussa AG, preferably Aerosil® R 100-8000. The surface of the element-oxygen network of the particles can also be partially modified with non-reactive groups.

The nano-scaled particles can be chemically bound in the resin structure of component (A) by chemical reaction of component (A) with the nano-scaled particles. Depending on the chemical nature of component (A) and the nano-scaled particles as mentioned above various chemical reactions are possible, for example, transesterification reaction, polymerisation reaction, addition reaction, condensation reaction.

The resin of component (A) may comprise the mentioned nano-scaled particles in amount of 0 to about 40 wt %, preferably 0 to about 20 wt %, the wt % based on the total weight of component (A).

As component (B), the composition comprises at least one organic solvent and/or water, in amounts of about 5 to about 75 wt %, preferably about 10 to about 70 wt %, based on the total weight of the varnish composition. Examples of organic solvents are aromatic hydrocarbons, N-alkyl pyrrolidones, aliphatic and/or aromatic esters, ketones, aliphatic carbonates, cresols, phenols, xylenols, aliphatic alcohols, aliphatic ethers, monoethers of aliphatic diols.

If water is used in component (B), the resin of component (A) may contain additional carboxylic or sulfonic acid functionalities which are neutralized by bases in order to achieve compatibility with or dispersability in water, as known at a person skilled in the art. Examples for such bases are sodium hydroxide, potassium hydroxide, magnesium hydroxide, lithium hydroxide, primary, secondary and tertiary amines such as triethylamine, dibutylamine, hexylamine, dimethylisopropylamine, diamines such as hexamethylene diamine, aminoalcohols such as ethanolamine, triethanolamin, N,N-dimethylethanolamine, N,N-dimethylisopropanolamine etc. If the amines are already used as condensation components during the preparation of the at least one resin (A), as such known at a person skilled in the art, no further neutralization by bases may be necessary.

Preferably, about 50 to about 100 wt % of component (B) is water, based on the total weight of component (B).

As component (C), the varnish composition contemplated herein may additionally comprise at least one resin different from (A), in amounts of 0 to about 40 wt %, preferably 0 to about 20 wt %, based on the total weight of the varnish composition. Examples are resins known at a person skilled in the art as cross-linking agents, for example, phenolic resins, melamine resins, blocked isocyanates, epoxides, depending on the kind of resin of component (A). Also, at least one other resin can be used as component (C), in order to obtain special properties of the entire coating composition, for example, to increase the speed of cross-linking or to increase the resistance against organic solvents. Those resins can be polyurethane resins, poly(meth)acrylate resins, partially or fully hydrolyzed polymers generated by copolymerization of maleic anhydride and (meth-)acrylic acid as well as possibly other co-monomers capable of radical polymerization such as styrene and (meth)acrylic esters, polyester resins, polyester imide resins, polyamide imide resins, polyimide resins, polyamide resins, epoxy resins, phenolic resins such as novolaks or resols, melamine resins, polycarbonate resins, alkyd resins, polymeric carboxylic acids, unsaturated polyester resins, and/or urethane acrylates, polymethacrylic imide, polyimides, polybismaleic imides, polyether imides, polybenzoxazine diones, polyhydantoins, polyvinylformals, polyvinylacetals, epoxy novolak resins, epoxy hybrid resins, for example, urethane modified epoxy resins, acryl-modified epoxy resins and epoxy esters and/or masked isocyanates.

The amount of component (C) is smaller than the amount of component (A) in the varnish composition contemplated herein.

Preferably, no component (C) is used in the varnish composition.

At least one customary additive known at a person skilled in the art can be used as component (D) in the varnish composition, in amounts of 0 to about 10 wt %, preferably about 0.1 to about 10 wt %, based on the total weight of the varnish composition. Examples are extenders, plasticising components, accelerators, for example metal salts, substituted amines, catalysts, such as, tetrabutyl titanate, isopropyl titanate, cresol titanate, triethanolamine titanate, the polymeric forms thereof, zirconates, such as n-propyl zirconate, triethanolamine zirconate, dibutyl tin dilaurate, zinc salts such as zinc acetate, initiators, for example, photo initiators, heat-responsive initiators, stabilisers, for example, hydroquinones, quinones, alkylphenols, alkylphenol ethers, defoamers and flow control agents.

As component (E) the varnish composition contemplated herein comprises at least one pigment, filler and/or nano-scaled particle and/or monomeric and/or polymeric element-organic compound, in a range of 0 to about 40 wt %, preferably about 0.1 to about 30 wt %, based on the total weight of the varnish composition.

Example of pigments and/or fillers are known at a skilled person, for example, fillers based on $SiO_2$, $Al_2O_3$, $TiO_2$, $Cr_2O_3$, $BaSO_4$, colour-imparting inorganic and/or organic pigments, such as, titanium dioxide or carbon black and effect pigments, such as, metal flake pigments and/or pearlescent pigments, in amounts of 0 to about 40.0 wt %, preferably 0 to about 30 wt %, based on the total weight of the varnish composition.

Further, nano-scaled particles can be used as component (E) which are not covalently part of component (A) as described above, in amounts of 0 to about 25, preferably 0 to about 15 wt %, based on the total weight of the varnish composition. Those nano-scaled particles are particles as described above hereto for component (A).

The varnish composition may also comprise at least one monomeric and/or polymeric element-organic compound as component (E), in amounts of 0 to about 40 wt %, preferably 0 to about 30 wt %, more preferably about 0.1 to about 30 wt %, based on the total weight of the varnish composition contemplated herein. Examples of polymeric organo-element compounds include inorganic-organic hybrid polymers of the type mentioned, for example, in DE-A 198 41 977. Examples of monomeric organo-element compounds include ortho-titanic acid esters and/or ortho-zirconic acid esters containing residues such as, nonyl, cetyl, stearyl, of triethanolamine, of diethanolamine, of acetylacetone, of acetoacetic ester, tetraisopropyl, cresyl, butyl, as well as titanium tetralactate, hafnium compounds and silicon compounds, for example, hafnium tetrabutoxide and tetraethyl silicate and/or various silicone resins. The varnish composition useable for the process described herein is a composition preferably consisting of (A) about 1 to about 95 wt % of at least one resin comprising nucleophilic groups selected from the group consisting of OH, NHR and SH, and electrophilic groups which can react with the above mentioned nucleophilic groups, wherein the resin is capable of transacylation in its main chain and/or side chain(s), (B) about 5 to about 75 wt % of at least one organic solvent and/or water, (C) 0 to about 40 wt % of at least one resin different from (A), (D) 0 to about 10 wt % of at least one customary additive, (E) 0 to about 40 wt % of at least one pigment, filler and/or nano-scaled particle and/or monomeric and/or polymeric element-organic compound, wherein the wt % is based on the total weight of the varnish composition (A) to (E) and wherein the amount of component (C) is smaller than the amount of component (A).

The varnish composition useable for the process contemplated herein is a composition more preferably comprising (A) about 5 to 60 about wt % of a resin comprising nucleophilic groups selected from the group consisting of OH, NHR and SH, and electrophilic groups which can react with the above mentioned nucleophilic groups, wherein the resin is capable of transacylation in its main chain and/or side chain(s), (B) about 10 to about 70 wt % of at least one organic solvent and/or water, (C) 0 to about 20 wt % of at least one resin different from (A), (D) about 0.1 to about 10 wt % of at least one customary additive, (E) about 0.1 to about 30 wt % of at least one pigment, filler and/or nano-scaled particle and/or monomeric and/or polymeric element-organic compound, wherein the wt % is based on the total weight of the varnish composition (A) to (E) and wherein the amount of component (C) is smaller than the amount of component (A).

The composition according to the invention may be produced by simply mixing the individual components together. For example, it is possible to produce a resin dispersion by mixing the at least one resin of component A) with water. The further components are then added, for example, with stirring, to produce a stable dispersion, optionally, with input of heat and dispersing agents. It is also possible to produce a mixture of the resin with the organic solvent. The further components are then added, e.g., by stirring.

Water and/or organic solvents as component (B) are added in a quantity such that a non-volatile content of, for example, about 20 to about 60%, preferably about 25 to about 50%, is obtained for the finished varnish composition.

The application of the composition by the process described herein proceeds, e.g., onto the surface of one or both sides of the electrical steel sheet as one or more coating layers, preferably as one coating layer, with a dry layer thickness of, for example, about 0.1 to about 30 μm, preferably, about 0.2 to about 20 μm, per layer.

In particular, the composition contemplated herein is suitable as a single-layer application.

The following examples are intended to illustrate the invention in greater detail. All parts and percentages are on a weight basis unless otherwise indicated.

EXAMPLES

Example 1

Preparation of Resin of Component (A) (Resin 1)

600 parts of tris(hydroxyethyl)isocyanurate, 885 parts of trimellitic anhydride and 430 parts of ethylene glycol were heated to 120° C. After addition of 2 parts of transesterification catalysts the mixture was heated to 180° C. and water was distilled off until an acid value of 72 mgKOH/g had been reached. At 165° C., 345 parts of triethanolamine were added. After further cooling to 130° C., 350 parts of methoxypropanol and 1400 parts of water were added. The pH value was adjusted to 8.5 using dimethylethanolamine. The obtained resin solution had a solid content (non-volatile content) of 49% (conditions of solid content determination: 1 h, 180° C.) and a viscosity of 300 mPas (25° C.) (DIN53211).

Example 2

Preparation of Resin of Component (A) (Resin 2)

1050 parts of tris(hydroxyethyl)isocyanurate, 1540 parts of trimellitic anhydride, 745 parts of ethylene glycol and 600 parts of triethanolamine were heated to 120° C. After addition of 4 parts of transesterification catalysts the mixture was heated to 210° C. and water was distilled off until an acid value of <5 mgKOH/g had been reached. After cooling to 140° C., 595 parts of phthalic anhydride were added, followed by an exothermal reaction. After cooling to 140° C., 700 parts of methoxypropanol and 2770 parts of water were added. The pH value was adjusted to 8.7 using dimethylethanolamine. The obtained resin solution had a solid content (non-volatile content) of 52% (conditions of solid content determination: 1 h, 180° C.) and a viscosity of 480 mPas (25° C.) (DIN53211).

Example 3

Preparation of Varnish Composition (Varnish 1)

100 parts of water, 3600 parts of Resin 1 and 6 parts of a dispersing additive were charged during agitation and homogenized. Then 20 parts of carbon black, 900 parts of a titanium dioxide pigment and 4350 parts of a barium sulfate filler were charged and dispersed for 20 minutes. After that, the mixture was homogenized in a pearl mill for 20 minutes. After milling, 85 parts of an aqueous modified silicate, 610 parts of Resin 1 and 320 parts of water were charged, and this mixture was homogenized by proper stirring for 20 minutes. The resulting varnish had a solid content (non-volatile content) of 77.0% (conditions of solid content determination: 2 h, 120° C.) and a viscosity of 175s (DIN53211, DIN4 cup, 20° C.).

Example 4

Preparation of Varnish Composition (Varnish 2)

95 parts of water, 3450 parts of Resin 2 and 6 parts of a dispersing additive were charged during agitation and homogenized. Then 20 parts of carbon black, 860 parts of a titanium dioxide pigment and 4150 parts of a barium sulfate filler were charged and dispersed for 20 minutes. After that, the mixture was homogenized in a pearl mill for 20 minutes. After milling, 600 parts of an aqueous modified silicate, 585 parts of Resin 2, 150 parts of flow additives and 90 parts of triethanolamine were charged and this mixture was homogenized by proper stirring for 20 minutes. The resulting varnish had a solid content (non-volatile content) of 77.5% (conditions of solid content determination: 2 h, 120° C.) and a viscosity of 148s (DIN53211, DIN4 cup, 20° C.).

Example 5

Preparation of Electrical Steel Sheet with Varnish 1

Varnish 1 was applied onto an M800* electrical steel sheet (0.5 mm thickness) as one-layer-coating and cured for 20 seconds at an oven temperature of 300° C. (peak metal temperature: approx. 210° C.). After curing the dry layer thickness is 5 µm.

*kind of steel according to EN 10106-2007

Example 6

Preparation of Electrical Steel Sheet with Varnish 2

Varnish 2 was applied at the same manner and conditions as described in Example 5.

Comparative Example

Preparation of Electrical Steel Sheet with Commercially Available Varnish Voltatex® 1151E Voltatex® 1151E (commercially available resin, DuPont) was applied at the same manner and conditions as described in Example 5.

Test Results

The test results of the electrical steel sheets coated with the varnish compositions of Example 5, 6 and Comparative Example can be found in Table 1.

TABLE 1

| Test | Standard | Example 5 | Example 6 | Comparative Example |
|---|---|---|---|---|
| Crosscut adhesion | DIN EN ISO 2609 | OK | OK | OK |
| Chemical resistance*: Acetone | DuPont internal* | >30 d.r.** | >30 d.r.** | >30 d.r.** |
| Chemical resistance*: Ethanol | DuPont internal* | >30 d.r.** | >30 d.r.** | >30 d.r.** |
| Chemical resistance*: Water | DuPont internal* | >30 d.r.** | >30 d.r.** | >30 d.r.** |
| Bend test (cylindrical mandrel) | DIN EN ISO 1519 | 3 mm OK | 3 mm OK | 3 mm OK |
| Breakdown voltage | DIN VDE 303 part 21 | 48 V/µm | 49 V/µm | 42 V/µm |
| Surface insulation resistance | EN 10282 | >1000 cm²/lamella | >1000 cm²/lamella | >1000 cm²/lamella |
| Formaldehyde emission during curing | qualitative | No | No | Yes |

*The chemical resistance is tested using a small portion of cotton wool, which is soaked with the respective solvent and then rubbed on the coated steel. A rubbing movement back and forth is counted as one double rub. The test result is the number of double rubs until the coating shows first damages.
**d.r. = double rubs The test results of the coatings based on Varnish 1 and Varnish 2 show that no formaldehyde emission during curing is observed, and very good coating properties can be provided.

What is claimed is:

1. A coating process for electrical steel sheet using a varnish composition, the coating process comprising the steps of:
    a) applying a coating layer of a varnish composition onto a surface of the electrical steel sheet wherein the varnish composition comprises:
        (A) about 1 to about 95 wt % of a resin comprising nucleophilic groups selected from the group consisting of OH, NHR and SH, and electrophilic groups that can react with the nucleophilic groups, wherein the resin undergoes transacylation in its main chain and/or side chain(s) by reacting the nucleophilic groups with the electrophilic groups,
        (B) about 5 to about 75 wt % of an organic solvent and/or water, wherein the wt % is based on the total weight of the varnish composition and
    b) curing the applied at least one coating layer, wherein the curing is performed at curing temperatures in the range of about 200 to about 600° C. and the curing is done in a time period of about 10 seconds to about 1 minute,
    wherein the electrophilic groups are carbon atoms bound via double bonds to oxygen atoms in esters.

2. The coating process according to claim 1 wherein the varnish composition comprises
    (A) about 5 to about 60 wt % of the resin, wherein the resin undergoes transacylation in its main chain and/or side chain(s),
    (B) about 10 to about 70 wt % of the organic solvent and/or water,
    (C) 0 to about 20 wt % of a resin different from (A),
    (D) about 0.1 to about 10 wt % of a customary additive,
    (E) about 0.1 to about 30 wt % of a pigment, filler and/or nano-scaled particle and/or monomeric and/or polymeric element-organic compound,
    wherein the wt % is based on the total weight of the varnish composition (A) to (E) and wherein the amount of component (C) is smaller than the amount of component (A).

3. The coating process according to claim 1 wherein the resin of component (A) comprises OH and/or SH as nucleophilic groups.

4. The coating process according to claim 1 wherein the resin of component (A) comprises polyurethanes and/or polyesters comprising the nucleophilic groups and the electrophilic groups wherein the resin undergoes transacylation in its main chain and/or in its side chain(s) by reacting the nucleophilic groups with the electrophilic groups.

5. The coating process according to claim 1 wherein applying comprises applying one coating layer of the varnish composition onto the surface of the electrical steel sheet.

6. The coating process according to claim 1 wherein the curing takes place at temperatures providing a PMT (peak metal temperature) in the range of about 180 to about 260° C.

7. A process for the production of an electrical steel sheet core, the process comprising:
    applying a coating layer of a varnish composition onto a surface of the electrical steel sheet wherein the varnish composition comprises:
        (A) about 1 to about 95 wt % of a resin comprising nucleophilic groups selected from the group consisting of OH, NHR and SH, and electrophilic groups that can react with the nucleophilic groups, wherein the resin undergoes transacylation in its main chain and/or side chain(s) by reacting the nucleophilic groups with the electrophilic groups,
        (B) about 5 to about 75 wt % of an organic solvent and/or water,
    wherein the wt % is based on the total weight of the varnish composition and curing the applied at least one coating layer, wherein the curing is performed at curing temperatures in the range of about 200 to about 600° C. and the curing is done in a time period of about 10 seconds to about 1 minute,
    wherein the electrophilic groups are carbon atoms bound via double bonds to oxygen atoms in esters,
    punching out parts of the coated electrical steel sheet after curing,
    stacking and assembling the parts to form a sheet core by technical means chosen from welding, clamping, interlocking, aluminium die casting and riveting.

8. The process according to claim 7 wherein the technical mean comprises welding.

9. An electrical steel sheet coated with a coating process using a varnish composition, the coating process comprising the steps of:
    a) applying a coating layer of a varnish composition onto a surface of the electrical steel sheet wherein the varnish composition comprises:
        (A) about 1 to about 95 wt % of a resin comprising nucleophilic groups selected from the group consisting of OH, NHR and SH, and electrophilic groups that can react with the nucleophilic groups, wherein the resin undergoes transacylation in its main chain and/or side chain(s) by reacting the nucleophilic groups with the electrophilic groups,
        (B) about 5 to about 75 wt % of an organic solvent and/or water, wherein the wt % is based on the total weight of the varnish composition and
    b) curing the applied coating layer, wherein the curing is performed at curing temperatures in the range of about 200 to about 600° C. and the curing is done in a time period of about 10 seconds to about 1 minute,
    wherein the electrophilic groups are carbon atoms bound via double bonds to oxygen atoms in esters.

10. The process according to claim 1 wherein the varnish composition of step a) additionally comprises
    (C) 0 to about 40 wt % of a resin different from (A),
    (D) 0 to about 10 wt % of a customary additive,
wherein the wt % is based on the total weight of the varnish composition and wherein the amount of component (C) is smaller than the amount of component (A).

11. The process according to claim 2 wherein the varnish composition of step a) additionally comprises
    (E) 0 to about 40 wt % of a pigment, filler and/or nano-scaled particle and/or monomeric and/or polymeric element-organic compound.

* * * * *